United States Patent Office 3,349,011
Patented Oct. 24, 1967

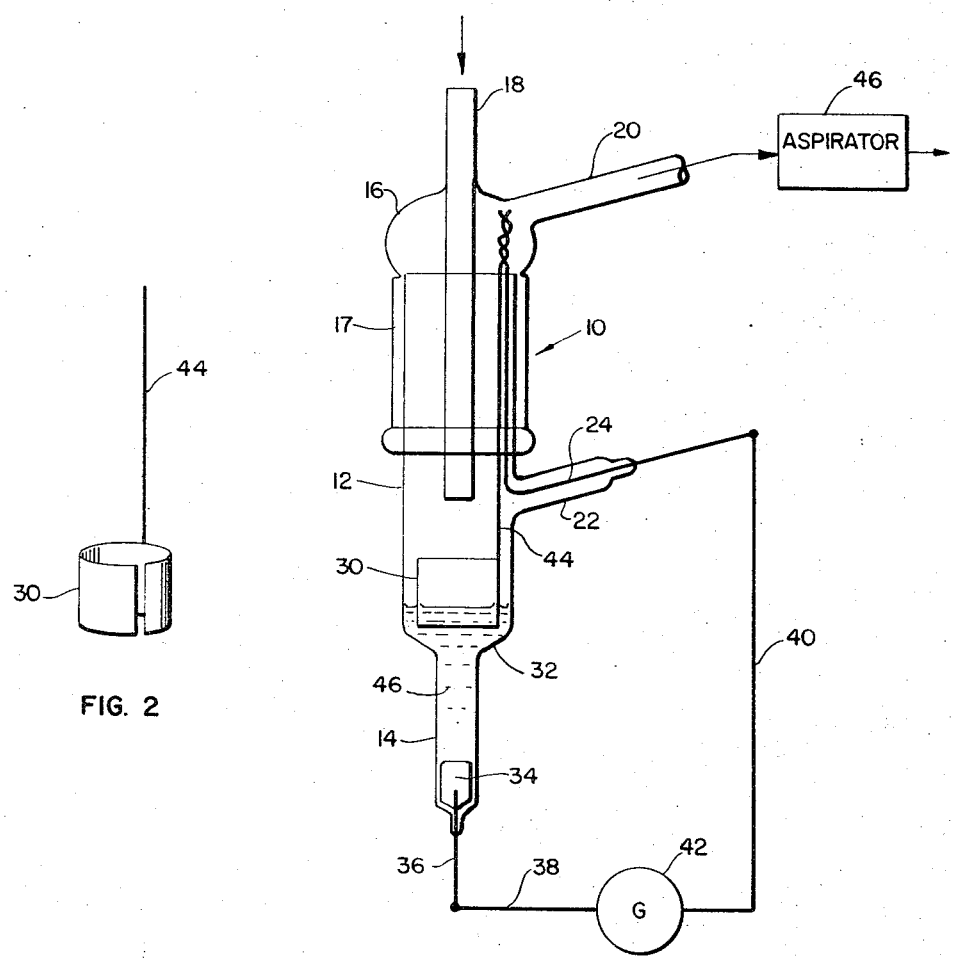

3,349,011
METHOD AND APPARATUS FOR MONITORING $CO_2$
Paul A. Hersch, Fullerton, and Carlos J. Sambucetti, La Habra, Calif., assignors to Beckman Instruments, Inc., a corporation of California
Filed Jan. 27, 1964, Ser. No. 340,157
7 Claims. (Cl. 204—1)

ABSTRACT OF THE DISCLOSURE

A galvanic cell for analyzing carbon dioxide in air or other gases containing oxygen. The cell has a cathode of platinum or palladium partly submerged in potassium hydroxide electrolyte with a mercury anode immersed in the electrolyte below the cathode.

---

This invention relates to gas analysis and, more particularly, to an improved galvanic monitoring process and apparatus for the continuous analysis of traces of carbon dioxide in a sample of air or other gases.

There is a requirement for the analysis of carbon dioxide in such diverse fields as medicine, plant physiology, fermentation processes, combustion economy and atmospheric analysis. For high ranges of concentration of carbon dioxide, the conventional monitors are based on thermal conductivity or infrared absorption principles. For trace measurements of carbon dioxide, several electrochemical methods are available, based either on the change in electrolytic conductivity produced by the gas in an alkaline electrolyte, or on the acidic nature of carbon dioxide causing a change in pH. In the electrolytic conductivity method, $CO_2$ is absorbed in an alkaline electrolyte such as barium hydroxide whereby barium carbonate precipitates and both barium and hydroxyl ions are removed causing the conductivity to decrease. Essentially, the method measures an A.C. current signal. In the method based on the acidic nature of $CO_2$ the $CO_2$ hydrolyses to carbonic acid producing a characteristic equilibrium pH value which may be measured by means of a glass electrode and a reference electrode. Carbon dioxide may also be made to diffuse through a plastic membrane into a film of bicarbonate solution held between the membrane and the glass membrane of a glass electrode/reference electrode system. In each of these methods, D.C. voltage is measured in a high impedance circuit.

It is the principal object of the present invention to provide an additional method and apparatus to those discussed above for continuously measuring $CO_2$ in air or other gases containing oxygen at low concentration levels.

Another object of the invention is to provide a simple and inexpensive electrochemical method and apparatus for measuring $CO_2$ which does not require any moving parts nor any continual or intermittent renewal of electrolyte.

Still a further object of the invention is to provide an electrochemical method and apparatus for determining $CO_2$ in a gas sample which does not require an external electromotive force and in which the D.C. current is measured rather than D.C. voltage or A.C. current signals as in prior art devices.

An apparatus which is somewhat similar to that of the present invention is described in an article entitled "Galvanic Determination of Traces of Oxygen in Gases" in Nature, vol. 169, page 792, May 10, 1952. This article describes an electrochemical cell which includes a platinum cathode partly submerged in a potassium hydroxide solution and a lead saturated mercury anode submerged in the solution. This apparatus is described as being capable of measuring trace amounts of oxygen in gases.

According to the principal aspect of the present invention, it has been discovered that $CO_2$ in air or in other gases which contain oxygen may be measured by substituting mercury which is free of any base metals for the lead saturated mercury in the cell described in aforementioned article in Nature. Much in contrast to the sensor for trace oxygen, the present cell virtually ignores atmospheric oxygen and generates but a very small current in the absence of carbon dioxide. However, when carbon dioxide containing gas is passed in a stream over the unsubmerged portion of the cathode in the cell, the carbon dioxide has an accelerating effect on the electrodissolution of atmospheric oxygen in the cell. This increases the small current generated in the cell, which increase provides a measure of the carbon dioxide concentration of the gas sample. This accelerating effect does not occur unless the electrolyte in the cell is KOH solution and the mercury anode is free of base metals. The cathode may be either platinum or palladium. The method and apparatus of the invention is sufficiently sensitive to serve in the range normally encountered in the atmosphere and provides a useful tool for laboratory or similar applications.

Other objects, aspects and advantages will become apparent from the following description taken in connection with the accompanying drawing wherein:

FIG. 1 is a side view of the galvanic cell of the present invention; and

FIG. 2 is a perspective view of the cathode of the invention.

Referring now to the drawing in detail, FIG. 1 shows the apparatus of the invention which is generally designated by numeral 10. The apparatus comprises an upper cylindrical portion 12 and a lower reduced diameter portion 14. The upper portion of the cell is closed by a separable cap 16 which has walls 17 disposed around the upper cylindrical portion 12. The cell is provided with an inlet tube 18 which is sealed into the upper end of the cap 16 and extends downwardly into the interior of the upper cylindrical portion 12 of the cell. An outlet port 20 for the cell is also provided in the cap 16. A port 22 extending from the side of the upper cylindrical portion 12 of the cell is provided for receiving a platinum wire 24 which is fused into the end of the glass port.

The cathode 30 of this cell may be formed of platinum or palladium. It is in the form of an annular ring, as best seen in FIG. 2, and is supported in the cell by an annular shoulder 32 which connects the upper cylindrical portion 12 and the lower reduced diameter portion 14 of the cell. In the lower portion of the cell 14 is disposed a pool of mercury 34 which constitutes the anode of the cell. A platinum wire 36 is fused into the bottom end of the cell and extends into the mercury pool 34. Leads 38 and 40 connect a galvanometer 42 to the platinum wires 36 and 24, respectively. The platinum wire 24 is connected to another platinum wire 44 spot welded to the side of the cathode 30. The ends of the wires 44 and 24 are twisted together at the upper end of the cell within the cap 16 thereby providing electrical connection between the cathode and the galvanometer 42.

The electrolyte which joins the anode and cathode in the cell is aqueous potassium hydroxide 46 which completely fills lower reduced diameter portion 14 and the bottom of the upper cylindrical portion 12 of the cell so that only a small portion of the cathode is submerged therein. It is important for the operation of the cell that the cathode have a large portion disposed above the meniscus of the electrolyte; however, it is relatively unimportant how much area of the cathode is submerged in the electrolyte; to save platinum and palladium, only a small portion of the cathode will normally be submerged in the electrolyte. Since the platinum wires 24 and 44 are connected above the upper end of the cylindrical portion 12 of the cell, it is seen that the cap 16 may be readily removed from the cell so that the wires 24 and 44 may be untwisted thus permitting the cathode to be removed from the cell for treatment, which will be described later. An aspirator 46 is connected to the outlet port 20 of the cell so that a sample gas such as air may be drawn through the inlet tube 18 into the cell to impinge upon the unsubmerged portion of the cathode 30 and then exit through the outlet port 20.

With stagnant air in the cell, a small current is generated proportional to the rate of combination of mercury with oxygen, according to the following equations:

At the cathode:

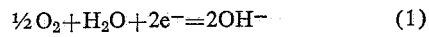

$$\tfrac{1}{2} O_2 + H_2O + 2e^- = 2OH^- \qquad (1)$$

At the anode:

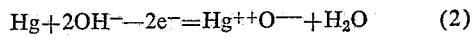

$$Hg + 2OH^- - 2e^- = Hg^{++}O^{--} + H_2O \qquad (2)$$

The net effect of these reactions is

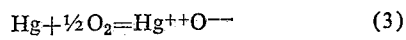

$$Hg + \tfrac{1}{2} O_2 = Hg^{++}O^{--} \qquad (3)$$

The oxygen which combines with the mercury does not come from the atmosphere but from the hydroxyl ions near the surface of the mercury anode. However, an equal amount of oxygen from the atmosphere is absorbed into the solution at the air/cathode/solution boundary line, that is, at the uppermost part of the meniscus of the electrolyte solution. This process creates as many new hydroxyl ions there as are used up near the mercury anode. The net effect of these two coupled processes, reactions 1 and 2 above, is the oxidation of mercury to yellow oxide, floating on the surface of the metal, with no overall change in the solution.

Since the consumption of hydroxyl ions at the mercury anode releases electrons into the circuit, and the production of hydroxyl ions at the cathode withdraws electrons from the circuit, a galvanic current flows through the galvanometer. The current is very small when the air above the cathode is stagnant. Such air is automatically freed from its carbon dioxide by dissolution of this acidic gas in the alkaline electrolyte. If, however, a stream of air impinges on the unsubmerged portion of the cathode, continually bringing along fresh $CO_2$, some of the $CO_2$, before being absorbed into the bulk of the alkaline solution, accelerates reaction 3; a relatively strong current is generated and is measured by the galvanometer. The increase of current is great enough to measure $CO_2$ concentrations on the order of a few hundred p.p.m. (i.e. a few hundredths of a percent) down to about 5 p.p.m.

It has been found that the condition of the cathode surface is important for the magnitude and speed of response to $CO_2$. A freshly cleaned platinum ring may at times produce an exceptionally high current increment upon introduction of $CO_2$ and permits a reasonably repeatable $CO_2$ signal over several hours use. The platinum ring may be cleaned by submerging it in a warm concentrated nitric acid for 1–2 minutes and then rinsing the ring with distilled water. Then the ring may be flamed to yellow heat in the colorless flame of a large Bunsen burner. Thereafter, the platinum is permitted to cool in air and then dipped into a potassium hydroxide solution in a beaker for wetting. The ring is then in condition for return to the cell 10.

The rate of flow of air sample through the cell is not critical. However, a flow rate of 100 ml. per minute has been used through the cell of the present invention although half or double that rate may also be chosen. Also, the electrical circuitry of the cell should have a resistance not greatly in excess of 1,000 ohms. Substantially higher values though not affecting the sensitivity of the cell may adversely affect the time constant thereof. A suitable galvanometer which may be used is one having a range of about 0–20 μA. with an impedance of 800 ohms. Obviously, a suitable recorder may be used in place of the galvanometer.

Although one might expect a similar action from metal cathodes other than platinum and palladium, it has been found that these are the only metals suitable for the detection of $CO_2$. Other metals such as nickel, gold, silver, stainless steel and copper have been substituted for the platinum or palladium cathode but without any success. Also, anodes other than mercury have been tried without success. A copper anode has been tested but the fluctuations in the background produced in the cell when using the copper anode are far too great to allow any differential effect from $CO_2$ to be determined. Cadmium or lead-saturated mercury, which are useful for measuring traces of oxygen in other gases, are valueless for measuring $CO_2$. It is essential in the present invention that the mercury anode be free of base metals.

Another essential feature of the invention is the electrolyte used in the cell. The electrolyte must be a potassium hydroxide solution. Though its concentration is not critical, a 5 molar solution is recommended. No electrolyte other than aqueous KOH has been found in which $CO_2$ in the cell has more than a spurious effect on the galvanic current. Thus, only the unique combination of a platinum or palladium cathode partly submerged in a potassium hydroxide solution with a mercury anode provides the unexpected results of the present invention. Other electrolytes which have been tested without success are LiOH, NaOH, Ba(OH)$_2$, Na$_2$CO$_3$, K$_2$CO$_3$, KHCO$_3$, KCl, KH$_2$PO$_4$+Na$_2$HPO$_4$ and (CH$_3$)$_4$NBr. However, it has been found that by the addition of some potassium bromide to the potassium hydroxide solution in the cell the speed of response of the cell to $CO_2$ is somewhat improved.

The apparatus of the invention is sufficiently sensitive to serve in the range normally encountered in the atmosphere with an accuracy better than ±2%. At lower levels of $CO_2$, the sensitivity of the cell is higher but fluctuations in the background may disturb the measurement. It is estimated that the limit of detection of the instrument is below 0.0005 v. percent (5 p.p.m.) $CO_2$. The time period required for the cell to reach 95% of the full deflection of the galvanometer is about 5–7 minutes and 95% recovery after removal of the $CO_2$ in the gas stream takes about 8 minutes. The $CO_2$ cell may be calibrated by passing an air stream with up to a few hundredths of one percent of $CO_2$ through the cell. Such a stream can be obtained in a number of different ways, one preferable method being the generation of $CO_2$ by the anodic evolution of $CO_2$ from a concentrated aqueous solution of oxalic acid (after freeing the air from the $CO_2$ which it normally carries at varying levels).

Although the above-described method and apparatus for determining $CO_2$ is generally suitable, the physical state of the platinum or palladium surface, temperature and some minor uncontrollable impurities might affect the output of the cell. Accordingly, it is sometimes advantageous to determine $CO_2$ with the apparatus of the present invention by using a "null method" in which the sample is compared with a known synthetic sample with a similar $CO_2$ content.

By generating electrolytic $CO_2$ from aqueous oxalic acid it is easy to produce ad hoc synthetic "samples" with a $CO_2$ level approaching that of the actual sample, with little delay, and even without requiring an extra air stream. One may alternatively pass into the cell (a) the actual sample stream and then (b) the sample stream stripped of its $CO_2$ and instead "doped" with a known proportion of $CO_2$, and compare the two galvanic outputs obtained. The electrolysis current for (b) may now be so adjusted that the two galvanic currents become identical. The current expended in the electrolysis is, then, a coulometric measure of the $CO_2$ in the sample. Such time-sharing of a sensor between unknown and adjusted known samples is sometimes used in optical devices of analysis. In the present case, this procedure eliminates uncertainties from ageing of the electrodes, lack of linearity, drift of background, and changing temperature.

Although only one embodiment of the cell structure has been disclosed herein for purposes of illustration, it will be understood that various changes can be made in the form, detail and arrangement and proportions of the various parts in such embodiment without departing from the spirit and scope of the invention as defined by the appended claims.

What is claimed is:

1. In a galvanic process for monitoring $CO_2$ in a gas sample containing $O_2$ and $CO_2$, the steps comprising:
   providing a cathode and a mercury anode free of base metals joined by KOH solution with said cathode being only partly submerged in said solution, said cathode being selected from the group consisting of platinum and palladium;
   conveying a stream of gas containing $O_2$ and $CO_2$ directly to the unsubmerged portion of the cathode; and
   measuring the current across said electrodes without driving a current through said electrodes from an external power source whereby the current measured is a function of the $CO_2$ content of the gas stream.

2. In a galvanic process for monitoring $CO_2$ in air, the steps comprising:
   providing a cathode and mercury anode free of base metals joined by KOH solution with said cathode being only partly submerged in said solution, said cathode being selected from the group consisting of platinum and palladium;
   conveying a stream of air directly to the unsubmerged portion of the cathode; and
   measuring the current across said electrodes without driving a current through said electrodes from an external power source whereby the current measured is a function of the $CO_2$ content of the gas stream.

3. A galvanic monitoring process as set forth in claim 1 wherein KBr is added to said solution.

4. A galvanic cell for monitoring $CO_2$ in a gas sample containing $O_2$ and $CO_2$ comprising:
   a cell adapted to hold a body of electrolyte;
   a cathode selected from the group consisting of platinum and palladium positioned in said cell with only the lower portion thereof adapted to be submerged in the body of electrolyte;
   means for producing a gas stream from said gas sample including means for discharging said stream adjacent to the upper portion of said cathode;
   a mercury anode free of base metals in said cell and spaced from said cathode; and
   circuit means connected to said electrodes, said circuit means including a current measuring means and being devoid of an electrical power source other than said electrodes for driving a current through said electrodes.

5. A galvanic cell for monitoring $CO_2$ in a gas sample containing $O_2$ and $CO_2$ comprising:
   a cell having inlet and outlet ports whereby a stream of gas sample may pass through said cell;
   said cell being adapted to hold a predetermined level of electrolyte and said inlet and said outlet ports being disposed above said level;
   a cathode selected from the group consisting of platinum and palladium positioned in said cell and having portions thereof disposed both above and below said predetermined level, one of said ports being adjacent to said portion of said cathode above said predetermined level;
   means for producing a gas stream from said gas sample and for conveying said stream through said inlet port, directly to said portion of said cathode above said predetermined level, and through said outlet port;
   a mercury anode free of base metals spaced from said cathode in said cell and positioned below said predetermined level; and
   circuit means connected to said electrodes, said circuit means including a current measuring means and being devoid of an electrical power source other than said electrodes for driving a curent through said electrodes.

6. A galvanic cell as set forth in claim 5 wherein only a minor portion of said cathode is disposed below said predetermined level.

7. A galvanic cell for monitoring $CO_2$ in a gas sample containing $O_2$ and $CO_2$ comprising:
   a cell adapted to hold a predetermined level of electrolyte, said cell having an inlet and outlet disposed above said level;
   a platinum cathode in said cell having the major portion thereof disposed above said predetermined level, said inlet being adjacent to said major portion of said cathode.
   means for producing a gas stream from said gas sample and for conveying said stream through said inlet, directly to said major portion of said cathode, and through said outlet;
   a mercury anode free of base metals spaced from said cathode and below said cathode so as to be below said predetermined level; and
   circuit means connected to said electrodes, said circuit means including a current measuring means and being devoid of an electrical power source other than said electrodes for driving a current through said electrodes.

References Cited

UNITED STATES PATENTS

| 751,897 | 2/1904 | Bodlander | 204—195 |
| 2,414,411 | 1/1947 | Marks | 204—195 |
| 2,677,656 | 5/1954 | Overbeck | 204—195 |
| 3,000,805 | 9/1961 | Carritt | 204—195 |
| 3,188,285 | 6/1965 | Watanabe et al. | 204—195 |

JOHN H. MACK, *Primary Examiner.*

T. H. TUNG, *Assistant Examiner.*